(12) United States Patent
Duchesnay et al.

(10) Patent No.: US 8,787,637 B2
(45) Date of Patent: Jul. 22, 2014

(54) METHOD FOR DEVELOPING AN INFORMATION PREDICTION DEVICE, USE THEREOF, AND CORRESPONDING STORAGE MEDIUM AND APPARATUS

(75) Inventors: Edouard Duchesnay, Paris (FR); Marie-Laure Paillere, Paris (FR); Arnaud Cachia, Paris (FR); Jean-Luc Martinot, Paris (FR); Eric Artiges, Longpont (FR)

(73) Assignees: Commisariat a l'Energie Atomique et aux Energies Alternatives, Paris (FR); Assistance Publique-Hopitaux de Paris, Paris (FR)

( * ) Notice: Subject to any disclaimer, the term of this patent is extended or adjusted under 35 U.S.C. 154(b) by 318 days.

(21) Appl. No.: 13/256,002

(22) PCT Filed: Mar. 12, 2010

(86) PCT No.: PCT/FR2010/050431
§ 371 (c)(1),
(2), (4) Date: Mar. 27, 2012

(87) PCT Pub. No.: WO2010/103248
PCT Pub. Date: Sep. 16, 2010

(65) Prior Publication Data
US 2012/0172707 A1      Jul. 5, 2012

(30) Foreign Application Priority Data
Mar. 12, 2009   (FR) ..................................... 09 51556

(51) Int. Cl.
*G06K 9/00*      (2006.01)
*A61B 5/05*      (2006.01)

(52) U.S. Cl.
USPC ............................ 382/128; 600/407; 600/410

(58) Field of Classification Search
USPC ......... 382/128, 129, 130, 131, 132, 133, 134, 382/190; 600/407, 410, 411, 425, 427, 433; 703/22; 704/262; 712/233, 239
See application file for complete search history.

(56) References Cited

U.S. PATENT DOCUMENTS 7,761,240 B2 * 7/2010 Saidi et al. ...................... 702/19
8,208,697 B2 * 6/2012 Schaffer et al. ............... 382/128

FOREIGN PATENT DOCUMENTS

JP      2005 169087 A      6/2005

OTHER PUBLICATIONS

Lichen Liang et al., "Spatial SVM for feature selection and fMRI activation detection", International Joint Conference on Eanural Networks, 2006, pp. 1463 to 1469.
Julia Neumann et al., "Combined SVM-Based Feature Selection and Classification", Machine Leanring, Kluwer Academic Publishers-Plenum Publishers, vol. 61, No. 1 to 3, Nov. 1, 2005, pp. 129 to 150.

(Continued)

*Primary Examiner* — Abolfazl Tabatabai
(74) *Attorney, Agent, or Firm* — Davidson, Davidson & Kappel, LLC

(57) ABSTRACT

A method for developing a prediction device for predicting a phenotype of a person from imaging data of the person is provided. The method includes determining imaging descriptors, the determining imaging descriptors including acquiring multidimensional images of people with an imaging apparatus and extracting multidimensional image elements from the acquired multidimensional images to serve as descriptors The method also includes classifying the predetermined descriptors on the basis of the capability thereof to predict the phenotype, selecting, from among the classified descriptors, a relevant number of the best-classified descriptors that is sufficient to predict the phenotype and constructing the prediction device from the selected descriptors.

12 Claims, 5 Drawing Sheets

(56) References Cited

OTHER PUBLICATIONS

Yong Fan et al., "Detecting Cognitive States from fMRI Images by Machine Learning and Multivariate Classification", Computer Vision and Pattern Recognition Workshop, 2006 Conference on New York, NY, Jun. 17, 2006, pp. 89 to 99.

Andrew Webb, "Statistical Pattern Recognition", "8.2 Feature Selection", Oxford University Press, Dec. 31, 1999, pp. 215 to 226.

Mourao-Miranda et al., "Classifying Brain States and Determining the Discriminating Activation Patterns: Support Vector Machine on Functional MRI Data", NeuroImage, Academic Press, Orlando, FL, vol. 28, No. 4, Dec. 1, 2005, pp. 980 to 995.

Luts et al., "A Combined MRI and MRSI Based Multiclass System for Brain Tumor Recognition Using LS-SVMs with Class Probabilities and Feature Selection", Artificial Intelligence in Medicine, Elsevier, NL, vol. 40, No. 2, Jun. 1, 2007, pp. 87 to 102.

Anonymous, "Resultat de Recherche: Combining SVMs with Various Feature Selection Strategies", Jun. 30, 2010, http://www.google.com/search?q=%22Combiming+SVMs+with+Various+Feature+Selection+Strategies%22&hl=en&sa=X&eo=wGYrT07ZLJik0J-f4LID&ved=0CAkQpwU&source=lnt&tbs+cdr%3A1%2Ccd_min%3A2005%2Ccd_max%3A2007>.

Yi-Wei Chen et al., "Properietes du document: Combining SvMs with Various Feature Selection Strategies", Jun. 30, 2010, http://www.csie.ntu.edu.tw/{cjlin/papers/features.pdf>.

Mikolajczyk et al., "A Performance Evaluation of Local Descriptrs", IEEE Transaction on Pattern Analysis and Machine Intelligence, IEEE Service Center, Los Alamitos, CA, vol. 27, No. 10, Oct. 1, 2005, pp. 1615 to 1630.

Yi-Wei Chen, Chih-Jen Lin, "Document Properties: Combining SVMs with Various Feature Selection Strategies" http:/www.csie.ntu.edu.tw/~cjlin/papers/features(Jun. 30, 2010). XP002589785.

\* cited by examiner

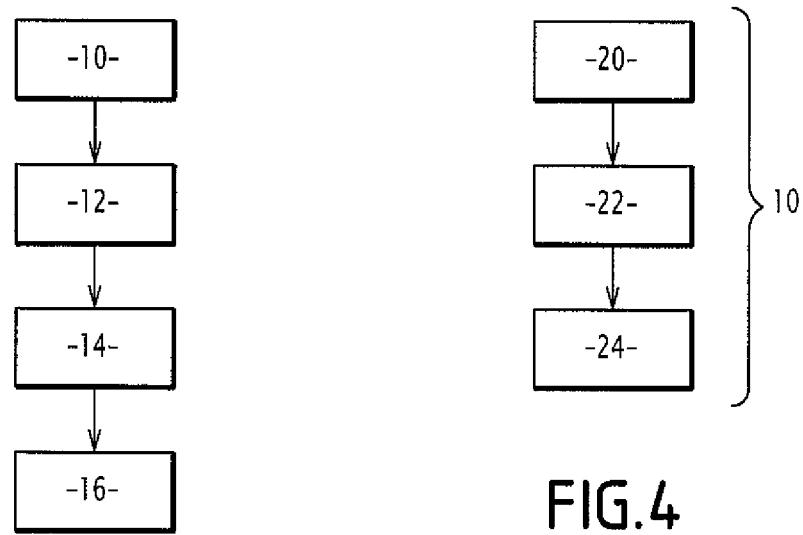
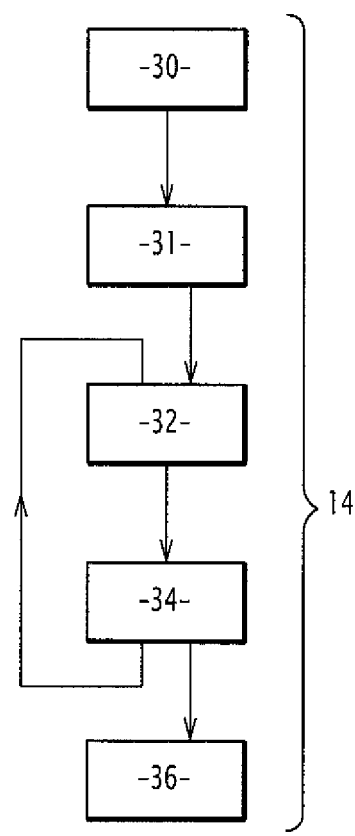

METHOD FOR DEVELOPING AN INFORMATION PREDICTION DEVICE, USE THEREOF, AND CORRESPONDING STORAGE MEDIUM AND APPARATUS

The present invention relates to a method for developing a prediction device for predicting a phenotype of a person from imaging data of the person.

BACKGROUND OF THE INVENTION

Known, in particular in the medical field, are prediction devices based on multivariable predictive functions, such as classifiers, which make it possible to predict information on all of the observable traits that characterize living beings, such as anatomical, morphological, molecular, physiological or ethological traits, or others.

A phenotype to be predicted can also be a clinical diagnosis, for example sick/not sick, or a patient's response to medical treatment.

The prediction thus relates to phenotype information that can be of different natures, e.g. biological, clinical (response to treatment, illness diagnosis, etc.) or demographic (age, sex, etc.).

The "phenotype" of a person therefore refers to any biological, clinical or demographic trait of that person.

However, such prediction devices are generally faced with what is commonly called the "curse of dimensionality," which is a well-known problem that amounts to drawing conclusions from a reduced number of observations in a large input data, or descriptor, space, which leads to poor performance of the prediction device.

SUMMARY OF THE INVENTION

The invention aims to propose a method making it possible to develop a prediction device having a good compromise between complexity and adjustment to the input data.

To that end, the invention relates to a method of the aforementioned type, characterized in that it comprises the following steps:
  determining imaging descriptors, the step including the following steps:
  acquiring multidimensional images of people with an imaging apparatus; and
  extracting multidimensional image elements from the acquired multidimensional images to serve as descriptors;
  classifying the predetermined descriptors on the basis of the capability thereof to predict the phenotype;
  selecting, from among the classified descriptors, a relevant number of the best-classified descriptors that is sufficient to predict the phenotype; and
  constructing the prediction device from the selected descriptors.

The inventive method can comprise one or more of the following features:
  the acquired multidimensional images are three-dimensional images and the image elements are voxels;
  the three-dimensional image acquisition step is done by positron emission tomography and/or by nuclear magnetic resonance;
  the step for determining descriptors comprises a step for pre-processing the acquired multidimensional images;
  the step for classifying the descriptors leads to a list of overlapping descriptor subsets;
  the step for classifying the descriptors is done using univariable methods such as a T test, an F test or an ROC analysis;
  the step for selecting the relevant number of best-classified descriptors comprises a step for calibrating a selection function for the number of descriptors on randomly permutated data;
  the step for selecting the relevant number of best-classified descriptors comprises the following steps:
  selecting a predictive function;
  applying, for any different numbers of best-classified descriptors, of a learning procedure specific to the predictive function chosen so as to determine the parameters of the predictive function so as to optimize the prediction of the phenotype;
  calculating, for the any different numbers of best-classified descriptors, a selection function for the number of descriptors from parameters of the determined predictive function; and
  selecting the number of best-classified descriptors that optimizes the selection function;
  the step for selecting the predictive function is based on a generative approach or a discriminating approach; and
  the step for computing the selection function is based on a combination of a term for adjusting to the data of the predictive function penalized by a term that depends on the complexity of the predictive function.

One use of the predictive device developed using a method as defined above consists of predicting the response of a person to treatment by transcranial magnetic stimulation from multi-dimensional images of the person's brain.

The invention also relates to an information storage medium comprising a code for developing a prediction device intended to predict a phenotype of a person from imaging data of the person, characterized in that the code comprises instructions to:
  determine imaging descriptors, the instruction comprising instructions to:
  acquire multidimensional images of people with an imaging apparatus; and
  extract multidimensional image elements from the acquired multidimensional images to serve as descriptors;
  classify the predetermined descriptors on the basis of the capability thereof to predict the phenotype;
  select, from among the classified descriptors, a relevant number of the best-classified descriptors that is sufficient to predict the phenotype; and
  construct the prediction device from the selected descriptors.

The invention also relates to an apparatus for developing a prediction device intended to predict a phenotype of a person from imaging data of that person, characterized in that it comprises:
  an imaging apparatus; and
  a data processing system comprising:
  determiner for determining imaging descriptors, the determiner comprising:
  acquirer for acquiring multidimensional images of people with the imaging apparatus; and
  extractor for extracting multidimensional image elements from the acquired multidimensional images to serve as descriptors;
  classifier for classifying the predetermined descriptors on the basis of the capability thereof to predict the phenotype;

selector for selecting, from among the classified descriptors, a relevant number of the best-classified descriptors that is sufficient to predict the phenotype; and constructor for constructing the prediction device from the selected descriptors.

BRIEF DESCRIPTION OF THE DRAWINGS

The invention will be better understood upon reading the following description, provided solely as an example and done in reference to the appended drawings, in which:

FIG. 3 is a flowchart showing the four main steps of the method according to the invention;

FIG. 4 is a flowchart illustrating the step for determining the descriptors in more detail;

FIG. 5 is a flowchart showing the step for selecting a relevant number of descriptors in more detail;

DETAILED DESCRIPTION

The method according to the invention consists of developing a device for predicting a phenotype of a person from multidimensional images of that person.

Figure 1:
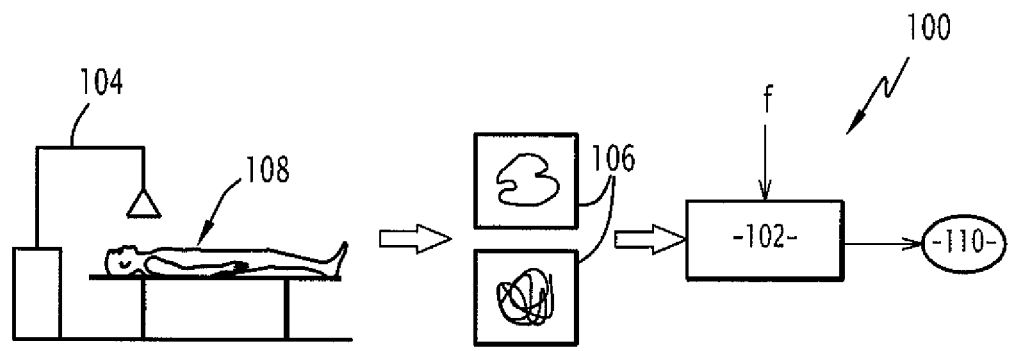
FIG. 1 is an operating diagram of a prediction device developed using the method according to the invention.

FIG. 1 illustrates a prediction facility 100 comprising a prediction device 102 and an imaging apparatus 104. The prediction device 102 is a device, for example a computer, that implements a predefined predictive function $f$ and which, from multidimensional images 106 of a person 108 acquired using the imaging apparatus 104, makes it possible to predict a phenotype 110 of the person 108.

In the medical field, a phenotype to be predicted can be a clinical diagnosis among two classes, for example sick/not sick. It is thus possible to predict a patient's response to a medical treatment, as will be explained in more detail later.

Figure 2:
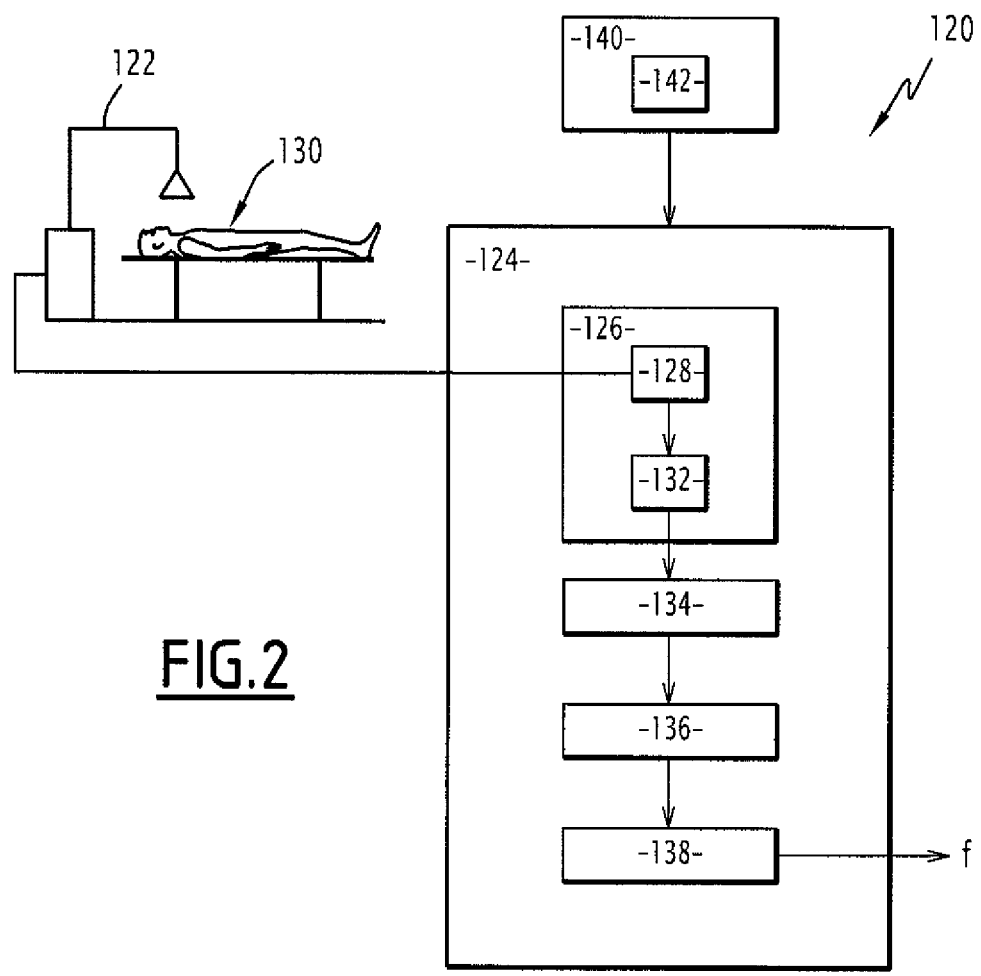
FIG. 2 is a diagrammatic view showing the apparatus for developing the prediction device of FIG. 1.

FIG. 2 shows an apparatus 120 making it possible to develop the prediction device 102, and more particularly the predictive function $f$. The apparatus 120 comprises an imaging apparatus 122 and a data processing system 124 connected to the imaging apparatus 122. The data processing system 124 comprises determiner 126 for determining imaging descriptors, the determiner 126 comprising an acquirer 128 connected to the imaging apparatus 122 for acquiring multidimensional images of N people 130 owing to the imaging apparatus 122, and an extractor 132 connected to the acquirer 128 to extract multidimensional image elements as descriptors from the acquired multidimensional images. The data processing system 124 comprises a classifier 134 connected to the extractor 132 to classify the determined descriptors as a function of their ability to predict the phenotype 110, a selector 136 connected to the classifier 134 to select, from among the classifying descriptors, a sufficient relevant number of best-classified descriptors to predict the phenotype 110, and a constructor 138 connected to the selector 136 to construct the predictive function $f$ and therefore the prediction device 102.

In the embodiment described here, the determiner 126, acquirer 128, extractor 132, classifier 134, selector 136 and constructor 138 of the data processing system 124 are implemented using an information storage medium 140 comprising a code 142 including instructions, each instruction respectively corresponding to each of determiner 126, acquirer 128, extractor 132, classifier 134, selector 136 and constructor 138.

The method according to the invention in particular relates to the classification of descriptors according to their relevance to predict the phenotype of interest 110, and the selection of the number of descriptors to be used to construct the predictive function $f$. A descriptor is information coming directly or indirectly from one or more multidimensional images 106 of the person 108.

First, the construction of the predictive function $f$ consists of looking for the number p of descriptors $x_i^p$ measured on the images of a sample i that will make it possible to predict its phenotype $y_i$, hereafter called the target variable:

$$f: R^p \to R$$

$$f(x_i^p, \theta^p) = y_i \quad (1)$$

where $\theta^p$ are the parameters of the predictive function $f$ on the p descriptors.

To deal with this problem, the descriptors are classified according to their relevance to predict the phenotype of interest, then one selects the number p of these descriptors that will be used in the predictive function $f$, the latter being chosen beforehand among the different types proposed in the literature.

Secondly, one estimates the parameters $\theta^p$ of $f$.

Lastly, the predictive function $f$ can be applied on the p descriptors $x_i^p$ from the images acquired on the sample i to predict the target variable $y_i$.

The different steps of the method according to the invention will now be described.

As shown in FIG. 3, the inventive method comprises four main steps:

a first step 10 intended to determine the descriptors and performed by the determining determiner 126 (FIG. 2);

a second step 12 intended to classify the descriptors determined in step 10 and performed by the classifier 134 (FIG. 2);

a third step 14 intended to select a relevant number of best-classified descriptors among the descriptors classified in step 12 and performed by the selector 136 (FIG. 2); and a fourth step 16 intended to construct the predictive function from the descriptors selected in step 14 and performed by the constructor 138 (FIG. 2).

In reference to FIG. 4, the first main step 10 for determining the descriptors also includes three secondary steps.

During a first secondary step 20 carried out by the acquirer 128 (FIG. 2), several multi-dimensional images of people 130 are acquired using an imaging apparatus 122.

In the embodiment described here, the acquired multidimensional images are three-dimensional images.

Alternatively, these images are 4D images.

The acquired three-dimensional images are then pre-processed (step 22), in particular recalibrated in a shared stereotaxic reference so as to ensure matching thereof to be able to compare and/or combine their respective information.

The three-dimensional images are made up of image elements, in particular voxels.

The voxels of the pre-processed three-dimensional images are then extracted and used directly as descriptors (step 24 carried out by the extractor 132 of FIG. 2).

One thus has a matrix X formed by the imaging data and a vector y formed by the phenotype information to be predicted.

One assumes that the matrix X is made up of P descriptors for N subjects that we will henceforth call "samples."

The matrix X of the imaging data then includes N rows and P columns, and the vector y (target variable) of the phenotype to be predicted includes N components.

The second main step 12 of the method according to the invention (FIG. 3) consists of classifying the descriptors as a function of their capacity to predict the phenotype y.

The third main step 14 of the method according to the invention consists of selecting the number p of best-classified descriptors that will be used by the final predictive function $f$.

The goal is to find the set of descriptors on which the predictive function $f$ has a good compromise between complexity and adjustment to the data so as to do away with the curse of dimensionality.

In fact, complex predictive functions, constructed on a large number of descriptors, tend to produce over-learning of the data, leading to poor performance on new data.

Conversely, excessively simple functions, using few descriptors, will not have the ability to capture effective discriminating patterns.

As illustrated in FIG. 5, the third main step 14 for selecting descriptors itself includes five secondary steps.

A first secondary step 30 consists of choosing the predictive function $f$.

A second secondary step 31 consists of calibrating a selection function g presented below, this calibration being done on simulated data. This calibration step 31 is carried out by a calibrator included in the data processing system 124, the calibrator being implemented using a corresponding instruction in the code 142.

These two secondary steps 30, 31 are carried out one time for all when the algorithm is started.

In a third secondary step 32, for p assuming values between 1 and P, a learning procedure $\text{learn}_f(X^p, y)$ specific to the predictive function $f$ is applied. One thus obtains the parameters $\theta^p$ of the predictive function $f$.

For these same values of p, one then calculates the selection function $g(X^p, y, \theta^p) \rightarrow R$, also specific to the predictive function $f$, which determines the compromise between complexity of the model and adjustment to the data (step 34), the calibration of this compromise having been done beforehand in step 31 on simulated data.

One then chooses, in step 36, the number p of descriptors that optimizes the selection function g:

$$p = \arg_{p \in [1, P]} \min g(X^p, y, \theta^p) \qquad (2)$$

The fourth main step 16 of the method according to the invention (FIG. 3) consists of constructing the predictive function from the p selected descriptors.

The prediction device 102 (FIG. 1) thus developed makes it possible, via the predictive function $f$, to predict the phenotype of interest 110, or target variable, of a person 108 from three-dimensional images 106 of that person 108, the images 106 forming the input data of the predictive function and the output data of said function corresponding to the prediction of the target variable 110.

We will now describe different embodiments for each of the steps of the method according to the invention.

Let us return to the first main step 10 for determining the descriptors.

The acquisition of three-dimensional images can be done using different imaging methods, for example a positron emission tomography (PET) camera and/or a nuclear magnetic resonance (NMR) scanner.

In the case of PET imaging, different tracers can be used, such as $^{18}$F-FDG, which reflects the metabolism of the considered tissue structure, or marked water ($H_2^{15}O$), which depends on the blood flow. In order to be free from global individual variations, the global average signal of each measured sample on the tissue structure is brought back to a value shared by all of the samples.

In the case of T1 or T2 weighted structural NMR imaging, a segmentation of the tissue into gray matter/white matter and cerebrospinal liquid (CSL) is done. The probability for each voxel of belonging to each of the two tissues and the CSL is then obtained.

In the case of diffusion NMR imaging, one obtains, in each voxel, measurements on the local diffusion of water at that point. These measurements reflect the local structure of the tissue: the most common are ADC (apparent diffusion coefficient) and fractional anisotropy (FA).

For the images coming from the different samples to be comparable to each other, the images are recalibrated in a shared reference for each imaging mode. An affine recalibration that globally aligns the images with each other or a nonlinear recalibration that allows local deformations so as to improve the alignment of the images is used.

By applying this recalibration toward a reference shared by the descriptors, one obtains, for each sample i, P descriptors that, once concatenated in a determined order, form the vector $x_i$.

Lastly, these vectors $x_i$, are concatenated to obtain the matrix X of the imaging data (with dimension N*P).

The second main step 12 for classifying the descriptors is carried out using univariable methods that classify the descriptors independently of each other.

The result is a list of overlapping subsets of descriptors $[F_1, F_2, \ldots, F_k, \ldots, F_P]$ where $F_k$ is the combination of the k best-classified descriptors.

These methods, also called filters, meet several criteria: their simplicity guarantees a calculation simplicity that is essential when the number of descriptors is high. Furthermore, this same simplicity limits over-learning based on training samples.

The use of methods derived from the Pearson correlation coefficient that makes the hypothesis of linearity between each descriptor and the target variable y is favored. If the target variable y is discrete, the hypothesis of linearity translates to the use of a T test or an F test.

Without a hypothesis of linearity, it is advantageous to use non-parametric tests, such as the Wilcoxon test. It is thus possible to use tests that measure only the quality of the separation between the groups, such as the area under curve (AUC) measurement of an ROC (Receiver Operating Characteristic) analysis, which is equivalent to the calculation of the Gini coefficient.

The third main step 14 for selecting descriptors begins with selecting a type of predictive function (step 30). In practice, this function is set by the user when the algorithm starts up.

Three types of predictive functions are considered.

The first type of predictive function is based on a generative approach and concerns regression tasks, i.e. when the target variable $y_i$ is quantitative ($y_i \in R$). The predictive function $f(x_i^p, \theta^p) = y_i$ is the linear regression, which is defined as follows:

$$f(x_i^p, \theta^p) = (x_i^p)'\theta^p \qquad (3)$$

And the learning function $\text{learn}_f(X^p, y)$ gives:

$$\theta^p = ((X^p)'X^p)^{-1}(X^p)'y \qquad (4)$$

The second type of predictive function is also based on a generative approach used for classification strictly speaking, i.e. when the target variable $y_i$ is discrete ($y_i \in \{1, \ldots, C\}$). A linear discriminating analysis (LDA) is used, in which:

$$f(x_i^p, \theta^p) = \operatorname{argmax}_{c \in [1,\ldots,C]} p_c \mathcal{N}\left(x_i^p \mid \mu_c^p, \sum^p\right) \qquad (5)$$

The learning function $\text{learn}_f(X^p, y)$ will consist of estimating the parameters $$\theta^p = \left(\mu_c^p, \sum^p\right)$$

and $p_c$ of the multivariable normal law $\mathcal{N}$, where $\mu_c^p$ is the average vector of the samples in class c, $$\sum^p$$

is the intra-class variance/covariance matrix, and $p_c$ is the a priori probability of class c.

The third type of predictive function is based on a discriminating approach and concerns classification tasks among two possible classes ($y_i \in \{1, -1\}$). Wide-margin separators, also called support vector machines (SVM), are used, defining:

$$f(x_i^p, \theta^p) = \operatorname{sgn}\left(\sum_{n \in [1,\ldots,N]} \alpha_n y_n K(x_n^p, x_i^p)\right) \qquad (6)$$

where $K(x_n^p, x_i^p)$ is the core function evaluated in p descriptors of point $x_n$.

A linear core where $K(x_n^p, x_i^p)$ is the scalar product between $x_n^p$ and $x_i^p$ is used. Let us recall that n is taken among the N learning samples and i is the index of the test sample for which one wishes to predict the phenotype $y_i$.

The learning function $\text{learn}_f(X^p, y)$ consists of estimating the parameters $\theta^p = \{\alpha_n \in R\}$, i.e. the contribution of each learning sample n. The objective is to maximize the margin $$\left(\sum_{n,m \in [1,\ldots,N]} [\alpha_n \alpha_m y_n y_m K(x_n^p, x_m^p)]\right)^{-1},$$

where m also represents a learning sample, under the constraint of proper classification of the learning samples. This problem of optimizing a stressed quadratic function can be resolved by using the Lagrange multiplexers. If the weighting contributed to the sample n is non-null ($\alpha_n \neq 0$), this sample will be said to be a support point for the classification function.

Regarding the selection function $g(X^p, y, \theta^p)$, which makes it possible to determine the number p of descriptors to be used to construct the predictive function, and as previously mentioned, we reformulated this problem as a model selection problem where one seeks to determine the number p of descriptors making it possible to construct a predictive model having good prediction performance on new data or on scans never before seen.

Figure 7:
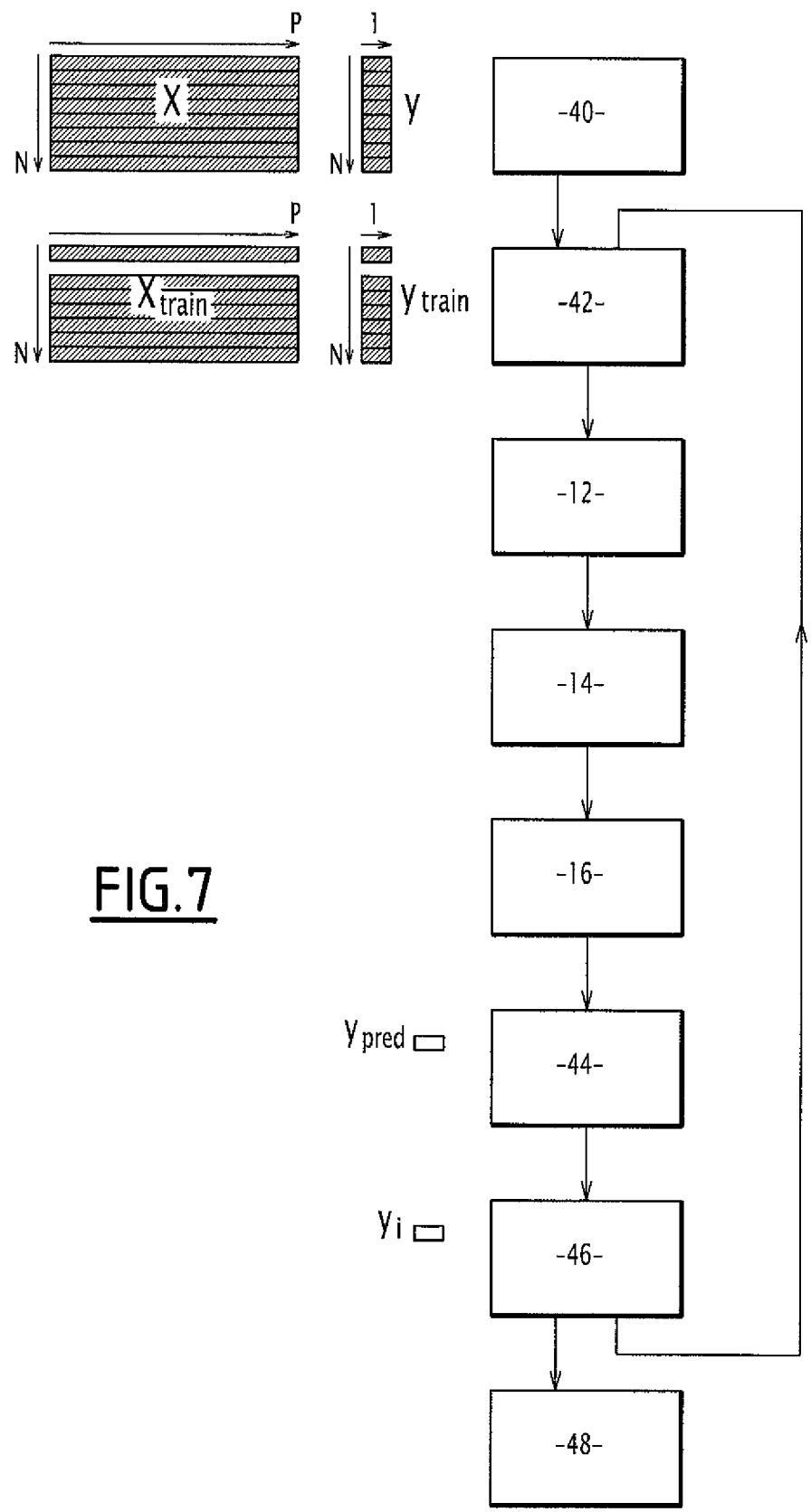
FIG. 7 is a flowchart illustrating the "leave-one-out" cross-validation procedure of the predictive function of the prediction device of FIG. 1.

A first approach consists of assessing the prediction capacity by cross-validation on the learning data. This approach works irrespective of the selected type of predictive function and requires two interlocking cross-validation loops. A first internal loop validates the parameters of the model on a subset of samples among the learning samples called validation samples. The second external loop, as shown in FIG. 7, validates the preceding model estimated on independent test samples.

Hereafter, scientific approaches of the selected predictive function type are proposed. The estimate of the predictive capacity can be reformulated as a good compromise between complexity of the model and adjustment to the data. We derive this idea for the two major families of predictive functions: generative functions and discriminating functions.

In the case of predictive functions based on a generative approach, the use of methods based on likelihood penalized by a term that depends on the complexity of the model is proposed. It is therefore first necessary to define the likelihood measurement as a function of the different types of predictive function. In the case of a linear regression task as predictive function, we have:

$$\mathcal{L}(X^p, y, \theta^p) = \prod_{n \in [1,\ldots,N]} \mathcal{N}(x_n^p \mid (x_i^p)'\theta^p, (\sigma^p)^2) \qquad (7)$$

with as residual variance:

$$(\sigma^p)^2 = \frac{1}{N-p} \sum_{n \in [1,\ldots,N]} (y_n - (x_n^p)'\theta^p)^2 \qquad (8)$$

In the case of a classification task with LDA as predictive function, we have:

$$\mathcal{L}(X^p, y, \theta^p) = \prod_{n \in [1,\ldots,N]} \left(p_c \mathcal{N}\left(x_i^p \mid \mu_c^p, \sum^p\right)\right)^{\delta(y_n, c)} \qquad (9)$$

with $\delta(y_n, c) = 1$ if $y_n$ is in class c, and 0 if not.

Thus, the implementation of the model selection function g is obtained by penalization of the preceding log-likelihoods with a criterion based on the BIC (Bayesian Information Criterion):

$$g(X^p, y, \theta^p) = \underbrace{-2\log\mathcal{L}(X^p, y, \theta^p)}_{(adjustment)} + \underbrace{k_2 \, p \log(N)}_{(capacity)} \qquad (10)$$

where p is the number of selected descriptors and N is the number of samples. The log-likelihood, which represents the adjustment to the data, is penalized by a second term that measures the capacity, or complexity, of the model. The weighting $k_2$ contributed to the penalization is determined by calibration on the randomly swapped data. If $k_2$ is set at one, then this criterion is equivalent to the BIC.

In the case of predictive functions based on a discriminating approach with SVM as predictive function, we propose to penalize the classification error rate (adjustment term to the data) by a term that depends on the complexity of the model (see equation 11). For this second penalization term, it is necessary to use a measurement whereof the calculation does not depend directly on the size; thus, it is possible to compare models based on spaces with different sizes. This measurement consists of counting the number of support points, i.e. $\#\{\alpha_n \neq 0\}$. Aside from its great simplicity, this measurement also reflects an upper boundary of the prediction error expected value. As a result, we propose to use this term to penalize an adjustment term to the data measured by the classification errors:

$$g(X^p, y, \theta^p) = \underbrace{\sum_{i \in [1,\ldots,N]} \left| y_i - \text{sgn}\left(\sum_{n \in [1,\ldots,N]} a_n y_k K(x_n^p, x_i^p)\right) \right|}_{(adjustment)} + \underbrace{k_2 \#(a_n \neq 0)}_{(capacity)} \quad (11)$$

Thus, in all cases, the descriptor selection function $g(X^p, y, \theta^p)$ is written as the sum of two terms: an adjustment term to the data and a capacity term of the predictive function whereof the weight ($k_2$) is determined by calibration on randomly permutated data.

For most predictive function types, there are theoretical elements that provide the respective contribution of these two terms under a number of hypotheses that are rarely respected in real cases of application.

In fact, the real cases of application are defined by:
(i) the considered data set;
(ii) the selected predictive function type; and
(iii) the method of classifying the descriptors.

These elements generally distance the real cases from theoretical application conditions. Thus, a poor weighting of the respective contributions of the adjustment term and the capacity term will favor exaggeratedly simple or complex models.

To resolve this problem, an automatic calibration method of the respective contributions by random swapping of the data is used.

The random permutation of the values of y makes the association between a sample $x_i$ and the phenotype $y_i$ to be predicted random.

Under this simulated null hypothesis, one calculates:
(i) the adjustment score on the learning data;
(ii) the capacity score of the predictive function; and
(iii) the generalization score to the independent test data.

Under a null hypothesis, the generalization score is theoretically known and corresponds to a random choice.

By re-sampling the $y_i$ by random permutation a large number of times and calculating these three scores for a variable number p of descriptors, the respective weight of (i) and (ii) in order to obtain an approximation or a satisfactory boundary of (iii) is determined.

Figure 6:
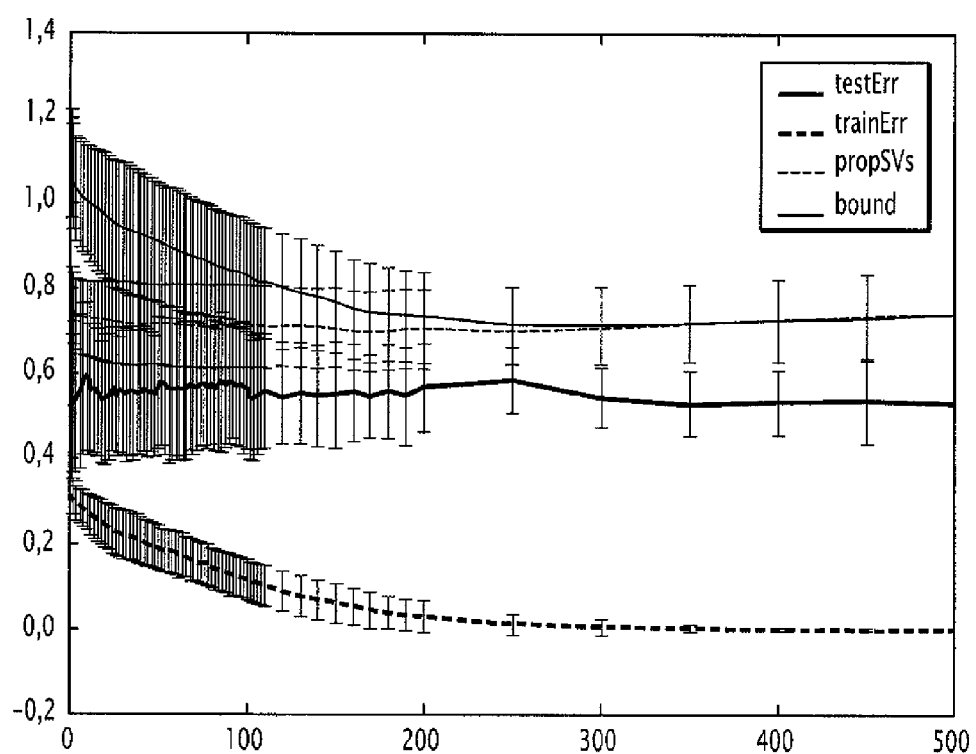
FIG. 6 is a graph showing prediction error rates as a function of the number of descriptors used by the predictive function of the prediction device of FIG. 1.

This determination can be empirical and visual and in that case, one verifies that the selected linear combination of the adjustment score and the capacity score provides a satisfactory upper boundary for the generalization score. FIG. 6 shows a concrete case of application of this method with a predictive function based on a linear SVM and represents the classification error rates on the training data "trainErr" (adjustment score) and on the test data "testErr" (score one wishes to approach) as a function of the number of descriptors used. These scores are calculated based on randomly permutated data. FIG. 6 also shows the number of support points normalized by the number of samples $\#\{\alpha_n \neq 0\}/N$ called "propSVs" (proportion of support vectors) and the sum of "propSVs" with "trainErr" called "bound" and that corresponds to $g(X^p, y, \theta^p)$ calculated according to equation 11 (to the closest factor N). A simple visual validation makes it possible to confirm theoretical results: the proportion of support vectors "propSVs" provides a classification error boundary obtained on test samples. However, in the small sizes (number of descriptors<200), this boundary is included in the standard deviation of "testErr." The use of the quantity defined in equation 11 (called "bound" in FIG. 6) resolves this problem by providing a satisfactory boundary in the small sizes.

Lastly, the respective weights of the adjustment score (i) and the capacity score (ii) can be calculated automatically using a linear model estimated on all of the values obtained by permutation:

$$\text{generalization} = k_0 + k_1 \text{ adjustment} + k_2 \text{ capacity} \quad (12)$$

Contrary to the preceding approach, where one seeks to bound the generalization, here the hypothesis is that the combination of the adjustment and the capacity can provide a good estimate of the generalization. We will note in passing that the latter is constant in the null hypothesis and therefore that this amounts to finding a way to penalize the adjustment by the capacity so that the combination of the two remains constant.

One concrete case of application of the method according to the invention consists of making the prognosis of the response to a transcranial magnetic stimulation (TMS) treatment of pharmaco-resistant depressed subjects from PET and NMR images acquired before treatment. The predictive function here will be a classifier to predict the response (yes/no) to the TMS treatment from images acquired before treatment.

Studies have shown that mood problems increase with time and could become, around 2020, the second leading cause of morbidity worldwide.

Between 20 and 30% of depressed patients end up developing depression that is resistant or refractory to treatment.

Transcranial magnetic stimulation, initially used in functional studies of the nervous system, appeared in the last decade as a new potential treatment for depression, and several studies have shown positive therapeutic effects, even on depressed patients resisting treatment, with an average decrease in depressive symptoms of about 34%.

Transcranial magnetic stimulation is a non-invasive medical technique that makes it possible to stimulate the cerebral cortex. It produces, owing to a stimulation coil placed on the surface of the head, neuronal depolarization with effects that spread in the connected cerebral regions.

However, the response to TMS treatment varies greatly according to the treated patients.

Studies have tried to correlate this variation of the response to the individual characteristics of the patients, such as age or sex, but have not succeeded.

In reality, depression is associated with the morphometry of the brain and functional changes in different cortical and sub-cortical regions.

There is therefore a relationship between the individual cerebral imaging characteristics and the response to the TMS treatment.

Below, we present the main steps of the method according to the invention to predict the patient's response to TMS treatment from PET and NMR scans acquired before treatment.

To extract descriptors, we used two imaging methods: PET imaging and NMR imaging.

NMR images of individual brains have been segmented into grey matter (GM)/white matter/cerebrospinal liquid, normalized in a shared stereotaxic reference, and modulated so as to ensure that the global quantity of each tissue group remains constant after normalization. These images were then smoothed with an isotropic Gaussian filter whereof the full width at half maximum (FWHM) is 10 mm.

The PET images of individual brains were normalized in the same stereotaxic reference and smoothed with a Gaussian filter whereof the FWHM is 8 mm.

The global intensity differences of the PET images have been corrected using proportional scaling.

We have selected, from the literature, eight regions that are part of the sub-cortical structures of the limbic system and frontal regions. These regions have been coarsely defined by applying a 2D morphological expansion in an axial plane using a unary 3×3 core on regions of an AAL (Automated Anatomical Labeling) atlas.

For each region, the voxels of the PET and GM regions have been concatenated in a vector of size P, thereby leading to regions of about 5000 voxels.

Let $\{(x_1,y_1), \ldots, (x_n,y_n)\}$ be the training data, where $y_j$ equals 1 or −1 depending on the class (responder or non-responder) to which point $x_j$ belongs.

Each $x_j$ is a real vector of size P obtained from the concatenation of the PET and NMR voxels in the considered region of the subject i.

Concerning the type of predictive function, we have chosen a linear SVM as previously described.

We then classified the descriptors according to their importance evaluated by a T test with two samples (responder/non-responder) that is equivalent to the correlation test previously mentioned.

We then constructed sets of p best-classified descriptors, with p belonging to $\{1, 10, 100, 1000, 1000, P\}$.

The selection of the number of p descriptors in $\{1, 10, 100, 1000, 1000, P\}$ to be used has been done by using the selection function $g(X^p, y, \theta^p)$ calculated with equation 11 and calibrated with the automatic calibration method previously presented.

The dimension vectors p are then used to construct the classifier.

The results obtained are the following.

The precision of the classifier has been assessed using a "leave-one-out cross validation" (LOO-CV) procedure that provides an unbiased estimate of the expected actual precision.

As shown in FIG. 7, from input data (initial step 40), this procedure LOO-CV sets aside the image $x_i$ and class $y_i$ of the subject i to be tested (step 42).

Steps 12 for classifying the descriptors, 14 for selecting the descriptors and 16 for constructing the predictive function of the inventive method are then carried out and take only the training subjects into account.

The predictive function is then applied to the test image $x_i$ to predict the class (responder or non-responder) of the test subject I (step 44). This prediction $y_{pred}$ is then compared with the real class $y_i$ of the test subject i (step 46).

Steps 42, 12, 14, 16, 44 and 46 are reiterated for all subjects, i.e. for all $i \in \{1,N\}$.

All of the predictions are then averaged to assess the performance of the classifier (step 48).

The responder and non-responder subjects were correctly classified in 85% of cases (for 29 subjects out of a total of 34 subjects), which is a significant rate with a p-value <2e-05.

The sensitivity of the classifier, which corresponds to the correct classification rate of responders, is also significant with a rate of 94% (for 17 out of 18 responder subjects) and a p-value of 7.248e-05.

The specificity of the classifier, which corresponds to the correct classification rate of non-responders, is also significant with a rate of 75% (for 12 out of 16 non-responder subjects) and a p-value of 0.03841.

Figure 8B:
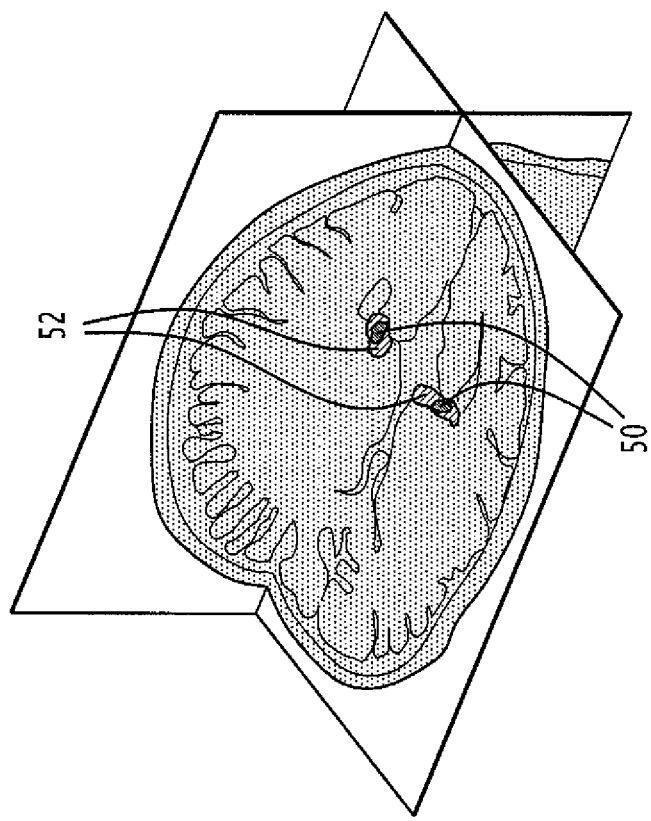
FIGS. 8A and 8B are perspective and cross-sectional views, respectively, showing regions of the brain of a person automatically selected by the method according to the invention.
Figure 8A:
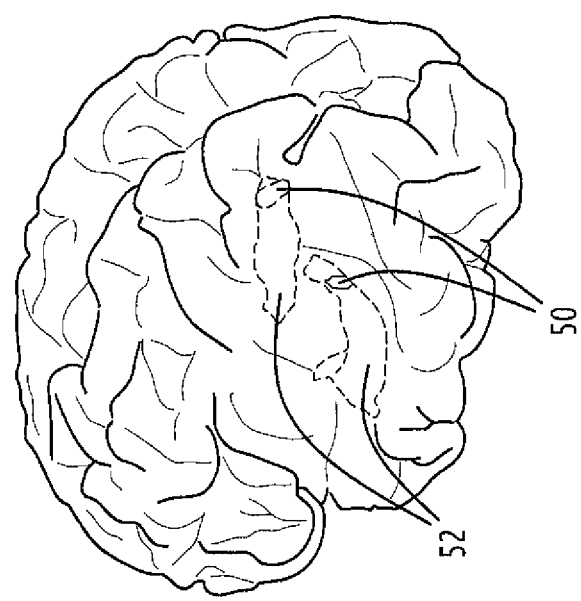

The precise prediction of the response of subjects to the TMS treatment could be obtained by applying the method on bilateral regions coarsely defined around the hippocampus. In fact, the applied method led to an automatic selection of 100 of the best-classified voxels and grouped into two regions (reference 50 in FIGS. 8A and 8B): the first region is formed by voxels obtained by NMR and localized in the rear part of the right hippocampus (reference 52 in FIGS. 8A and 8B) and the second region is formed by voxels obtained by PET and located in the rear part of the left hippocampus (reference 52 in FIGS. 8A and 8B).

The invention therefore proposes a method making it possible to develop a prediction device based on a multivariable prediction function and making it possible to predict the phenotype of a person, such as the person's membership in a class, from multidimensional images of that person.

In the case of the response to TMS treatment, the method according to the invention will make it possible to select the patients who could potentially respond to TMS treatment and avoid losing time treating patients who may not respond to TMS treatment.

The prediction concerns phenotype information that may be of different natures, for example clinical (response to treatment, diagnosis of a disease, etc.) or demographic (age, sex, etc.).

The invention claimed is:

1. A method for developing a prediction device for predicting a biological, clinical or demographic trait of a person from imaging data of the person, the method comprising:
   determining imaging descriptors, the determining the imaging descriptors including:
      acquiring multidimensional images of people with an imaging apparatus; and
      extracting multidimensional image elements from the acquired multidimensional images to serve as descriptors;
   classifying the predetermined descriptors on the basis of the capability thereof to predict the trait;
   selecting, from among the classified descriptors, a relevant number of the best-classified descriptors that is sufficient to predict the trait, the selecting the relevant number of best-classified descriptors including calibrating a selection function of the number of descriptors on randomly permutated data; and
   constructing the prediction device from the selected descriptors.

2. The method according to claim 1 wherein the selecting the relevant number of best-classified descriptors comprises:
   selecting a predictive function;
   applying, for any different numbers of best-classified descriptors, a learning procedure specific to the predictive function chosen so as to determine parameters of the predictive function so as to optimize the prediction of the trait;
   calculating, for the any different numbers of best-classified descriptors, a selection function for the number of descriptors from parameters of the determined predictive function; and selecting the number of best-classified descriptors that optimizes the selection function.

3. The method according to claim 2 wherein the computing the selection function is based on a combination of a term for adjusting to the data of the predictive function penalized by a term that depends on the complexity of the predictive function.

4. The method according to claim 2 wherein the selecting the predictive function is based on a generative approach or a discriminating approach.

5. The method according to claim 1 wherein the acquired multidimensional images are three-dimensional images and the image elements are voxels.

6. The method according to claim 5 wherein the three-dimensional images are acquired by at least one of positron emission tomography and nuclear magnetic resonance.

7. The method according to claim 1 wherein the determining the imaging descriptors further includes pre-processing the acquired multidimensional images.

8. The method according to claim 1 wherein the classifying the descriptors leads to a list of overlapping descriptor subsets.

9. The method according to claim 8 wherein the classifying the descriptors is done using univariable methods such as a T test, an F test or an ROC analysis.

10. A method for a prediction device developed according to the method of claim 1, comprising:
predicting the response of a person to treatment by transcranial magnetic stimulation from multidimensional images of the person's brain.

11. A non-transitory computer-readable storage medium comprising a code for developing a prediction device intended to predict a biological, clinical or demographic trait of a person from imaging data of the person, the code comprising:
instructions to determine imaging descriptors, the instructions to determine imaging descriptions comprising:
instructions to acquire multidimensional images of people with an imaging apparatus; and
instructions to extract multidimensional image elements from the acquired multidimensional images to serve as descriptors;
instructions to classify the predetermined descriptors on the basis of the capability thereof to predict the trait;
instructions to select, from among the classified descriptors, a relevant number of the best-classified descriptors that is sufficient to predict the trait, the instruction comprising an instruction to calibrate a function for selecting the number of descriptors on randomly permutated data; and
instructions to construct the prediction device from the selected descriptors.

12. An apparatus for developing a prediction device intended to predict a biological, clinical or demographic trait of a person from imaging data of that person, characterized in that it comprises:
an imaging apparatus; and
a data processing system comprising:
a determiner for determining imaging descriptors, the means comprising:
acquirer for acquiring multidimensional images of people by means of the imaging apparatus; and
extractor for extracting multidimensional image elements from the acquired multidimensional images to serve as descriptors;
classifier for classifying the predetermined descriptors on the basis of the capability thereof to predict the trait;
selector for selecting, from among the classified descriptors, a relevant number of the best-classified descriptors that is sufficient to predict the trait, the means comprising means for calibrating a selection function for the number of descriptors on randomly permutated data; and
constructor for constructing the prediction device from the selected descriptors.

* * * * *